Inventors:
Ian Carrodus Hutcheon
and
Derrick Norman Harrison
BY Baldwin & Wight
ATTORNEYS May 28, 1968 I. C. HUTCHEON ET AL 3,385,107

APPARATUS FOR CONVERTING THE RATIO OF TWO ALTERNATING ELECTRIC SIGNALS INTO A DIRECT CURRENT

Filed Aug. 6, 1965 3 Sheets-Sheet 2

Inventors:
Ian Carrodus Hutcheon
and
Derrick Norman Harrison
By Baldwin Wight Diller & Brown, Attorneys Inventors:
Ian Carrodus Hutcheon
and
Derrick Norman Harrison
BY Baldwin Wight Diller & Brown, Attorneys United States Patent Office 3,385,107
Patented May 28, 1968

3,385,107

APPARATUS FOR CONVERTING THE RATIO OF TWO ALTERNATING ELECTRIC SIGNALS INTO A DIRECT CURRENT

Ian Carrodus Hutcheon, Luton, and Derrick Norman Harrison, Kings Stanley, Stroud, England, assignors to George Kent Limited, London, England, a corporation of England Filed Aug. 6, 1965, Ser. No. 477,760
Claims priority, application Great Britain, Aug. 13, 1964, 33,026/64
8 Claims. (Cl. 73—194)

ABSTRACT OF THE DISCLOSURE

An electrical ratio converter apparatus for providing a DC output signal proportional to the ratio of two AC input signals and having an AC input amplifier, a balanced demodulator, an integrating smoothing circuit, a DC output amplifier for connection to output measuring apparatus, and a feedback circuit including a Hall device, wherein the integrating smoothing circuit includes a low-drift DC amplifier, and the said demodulator, smoothing circuit and DC amplifier cooperate to provide high level forward path quadrature rejection.

Figure 1:
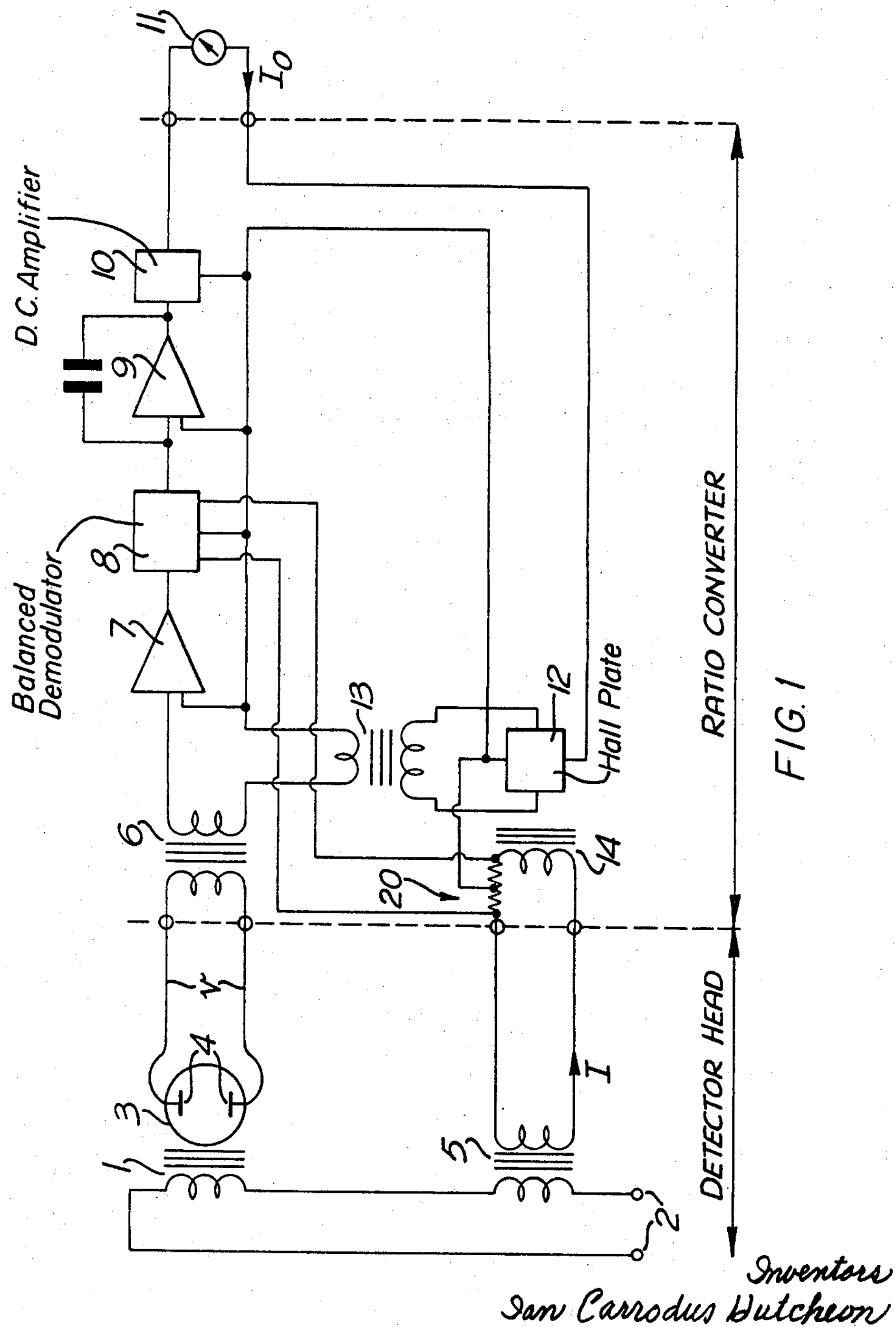

This invention relates to electrical ratio converter apparatus for giving a direct current output proportional to the ratio of one alternating electric signal to another alternating electric signal.

Electrical ratio converted apparatus, having an AC input amplifier followed by a balanced ring demodulator, and a feedback circuit comprising a Hall device, is known. Such a circuit, however, is easily saturated by quadrature signals and requires a quadrature suppression loop.

The apparatus of the present invention includes an integrating smoothing circuit and a DC amplifier, as means for enabling the demodulator to operate with low-level signals, so that it can accept large noise or quadrature signals without saturating.

According to the present invention electric ratio converter apparatus, responsive to the ratio of a first alternating signal to a second alternating signal comprises an AC input amplifier, a balanced demodulator, and an integrating smoothing current including a low-drift DC amplifier connected together in cascade and in that order: a feedback circuit comprising a Hall device having a Hall plate; a magnetic field coil; a first pair of terminals connected to a first axis of the Hall plate, and to the input of the AC amplifier in series with terminals for connection to the first alternating signal; and two other pairs of terminals, one pair being connected to a second axis of the Hall plate, the other pair being connected to the magntic field coil; a first of said two other pairs of terminals being connected to the output of the DC amplifier, the second of said two other pairs of terminals being connectable to the second alternating signal: the balanced demodulator operating with a reference signal derived from the second alternating signal, the AC amplifier and demodulator being phased such that any component of the first alternating signal which is in phase-quadrature with the second alternating signal will be rejected from the demodulator output; the apparatus being so proportioned and arranged that, in operation, the loop gain is high; whereby the output of the DC amplifier will be proportional to the ratio of the signals.

The integrating smoothing circuit may, for example, comprise a low drift DC integrating feedback amplifier; or a resistance-capacitance integrating network, a low drift DC amplifier and means connecting the network and the amplifier together in cascade, in that order.

The invention will be described, by way of example only, with reference to an apparatus applied to the measurement of liquid flow by magnetic means. It is well known that if an alternating magnetic field is applied to a pipe through which an electrically conductive liquid is flowing, then an alternating voltage may be picked up by a pair of electrodes suitably disposed within the liquid. Such an arrangement is shown, diagrammatically, in the Detector Head shown in the accompanying drawings. The induced voltage, $v$ in the drawing, is related to the rate of flow of the liquid in the pipe and will hereinafter be called the flow signal.

Figure 2:
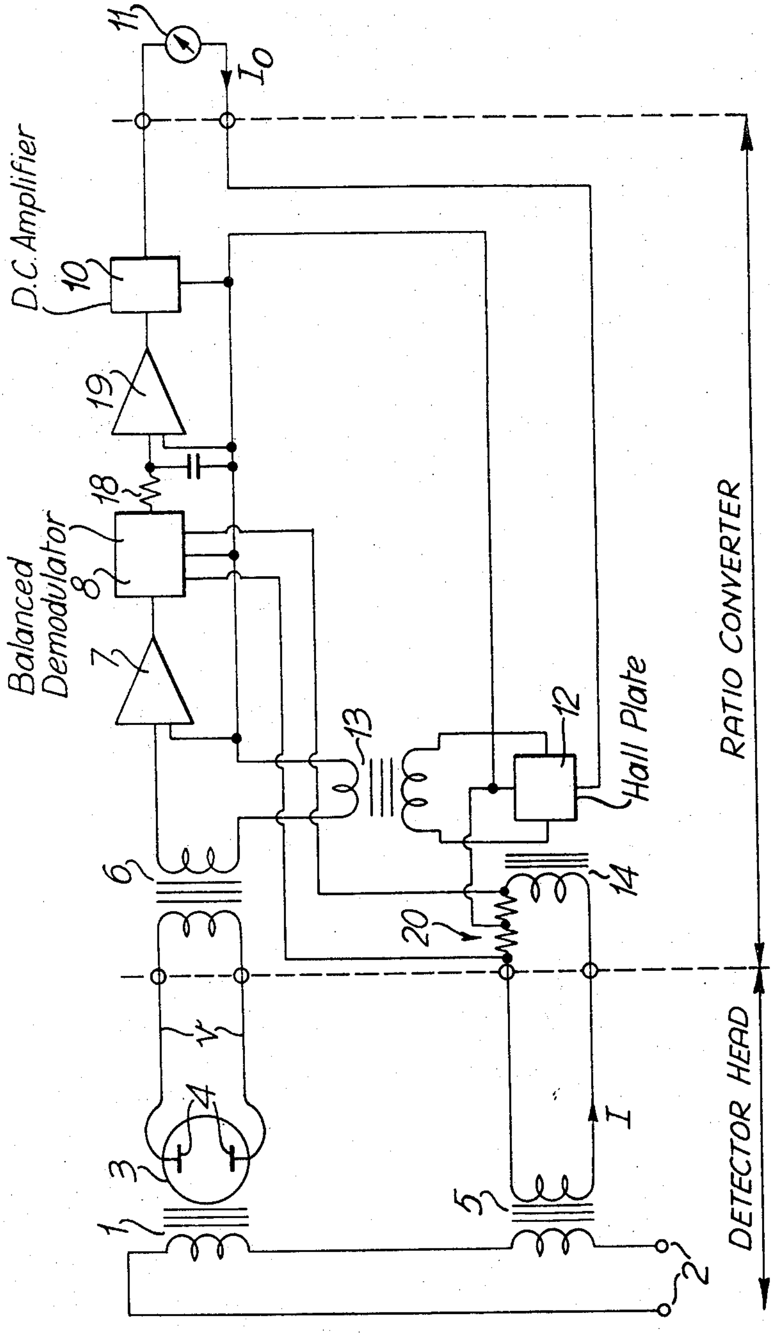
Figure 3:
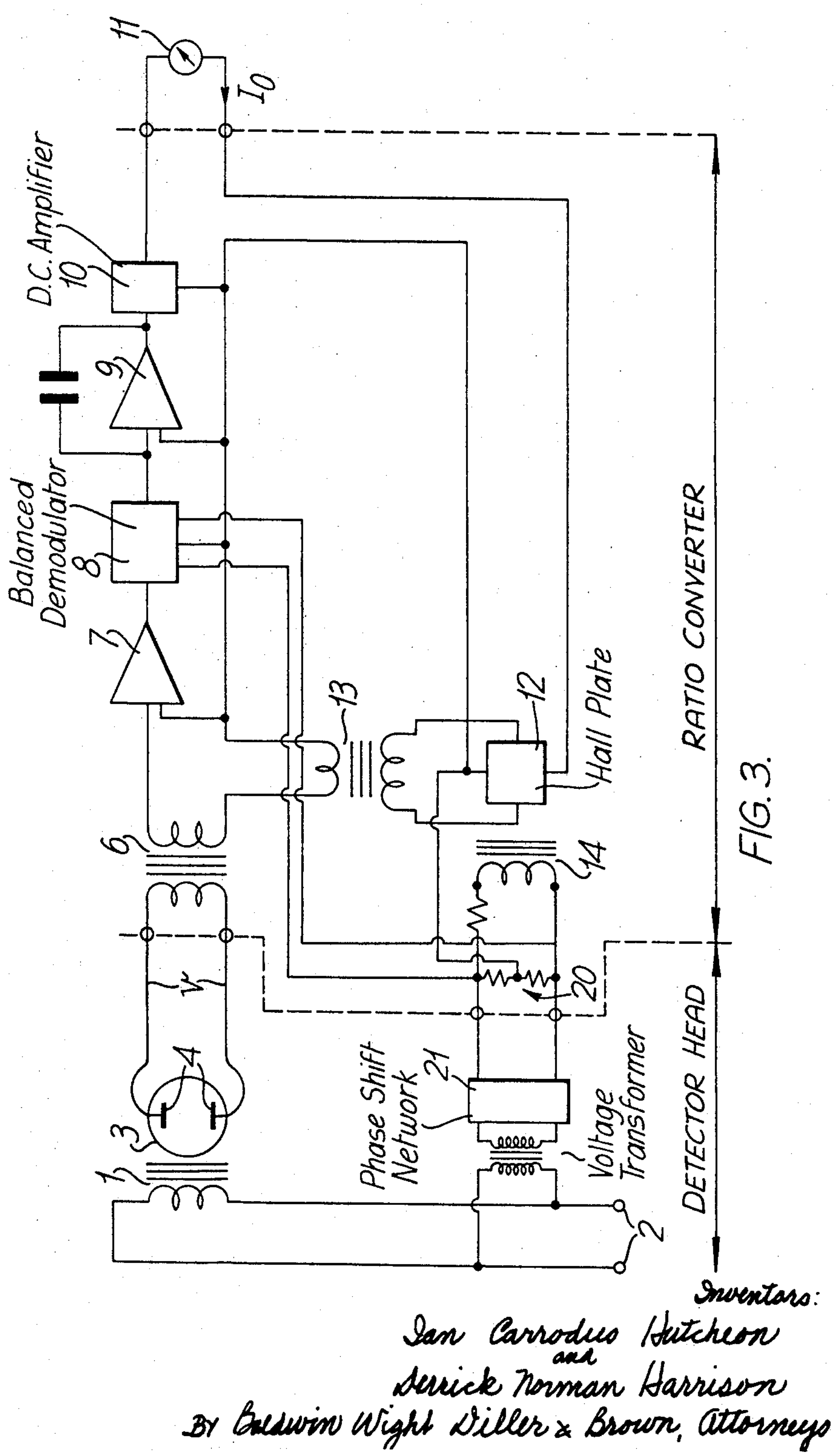

Referring to the drawing: FIG. 1 is an electrical circuit diagram schematically illustrating one form of the invention; and FIGURES 2 and 3 are similar diagrams respectively illustrating other forms of the invention.

In FIGURE 1 of the drawings, 1 is a field coil connected to a source of alternating current at 2. Current flowing through this field coil 1 establishes a magnetic field in a pipe 3, through which liquid is flowing. As a result, a flow signal $v$ is produced across electrodes 4, 4. The primary of a transformer 5 is connected in series with the field coil 1, whereby a signal appears at the secondary of the transformer; this signal is shown in the drawing as a current I. The rate of flow of the liquid is then proportional to the ratio $v/I$, which is independent of supply voltage and frequency.

In the drawings, the principle of an apparatus according to this invention is shown, diagrammatically, as the ratio converter. The flow signal, $v$ is applied to the primary of a transformer 6. This transformer isolates the converter from common mode voltages such as may be present in the flow signal and also matches the impedance of the electrodes to the input of an AC amplifier 7.

From transformer 6 the flow signal is passed to the AC amplifier 7 and to a demodulator 8. The demodulator is a symmetrical, full wave type and is driven by a reference signal, derived from the transformer 5 by means 20. The demodulator may, for example, comprise transistor switches. The amplifier and demodulator are phased such that any quadrature component present in the flow signal (provided it is not so great as to cause saturation) is rejected by the demodulator. The demodulated signal is then smoothed by an integrating feedback amplifier 9 in FIGURE 1, or by a resistance-capactitance network 18 and amplifier 19 in FIGURE 2. The amplifier has a low drift, so the gain of the AC amplifier 7 can be low. The demodulator thus normally operates with low level signals and can accept large noise or quadrature signals without saturation. The signal from the integrating amplifier 9 is passed to a DC output amplifier 10, whose output is connected to an indicator 11 and to one pair of terminals of a Hall device 12. A second pair of terminals of the Hall device are connected to the primary of a transformer 13, whose secondary is connected in series with the secondary of transformer 6 and the input of amplifier 7. A field coil 14, connected via a third pair of terminals to the secondary of transformer 5, provides a magnetic energizing field for the Hall device; which field is proportional to the current signal I. The alternating current output of the Hall device, fed to transformer 13, is thus proportional to the product of the direct curren $I_0$, flowing through the indicator 11, and the current I. This alternating current output is applied, through transformer 13, so as to oppose the flow signal at the input to the amplifier 7. The ratio converter thus forms a closed loop null balance ratio device, the direct current output $I_0$ being proportional to the ratio $v/I$ of the two alternating input signals.

In practice, the circuit may include detailed refinements. The transformer 13 may be provided with multi-tap connections so that the range of measurement may be selected. Adjustment means may be provided at the primary of this transformer, to enable these ranges to be accurately set, during calibration. Further devices connected to the primary of transformer 13 may include a zero adjustment, which may be set under zero flow conditions, and a switch for changing from operate to calibrate conditions. This may connect the AC amplifier input across a particular tapping on the transformer 13, in series with an AC signal derived from the transformer 5. The circuit values may be such that, in this condition, the direct current output corresponds to some predetermined fraction of full scale, when the calibration adjustments are correct.

Each of a plurality of ratio converters according to this invention may have an input circuit, for connection to the transformer 5, having a predetermined impedance identical with those of all the other converters. Each detector head may then have resistance devices connected to the secondary of transformer 5 and adjusted, in manufacture, so that the head may match any ratio converter having the said predetermined input impedance. A capacitor, the capacitance of which is also selected during manufacture, may be connected across the secondary of transformer 5, to correct varying phase errors due to electrical losses in individual detector heads.

In the example described hereinbefore, the direct current output of the apparatus is passed through the plate of the Hall device, the signal represented by the current I being passed through the field coil of the Hall device. In an alternative form, the direct output current may be passed through the field coil, the signal represented by I being applied to one pair of terminals of the Hall plate. According to another modification, illustrated in FIGURE 3, the signal represented by I may be derived from the potential of the alternating current source 2, via a circuit 21 for suitably adjusting the phase of the signal.

What is claimed is:

1. In an electrical ratio converter apparatus responsive to the ratio of a first alternating signal to a second alternating signal, the apparatus having an AC input amplifier and balanced demodulator connected to receive the output of said AC input amplifier, a feed back circuit comprising a Hall plate with first and second electrical axes, a magnetic field coil for establishing a magnetic field in the Hall plate, first and second terminal pairs connected respectively to said first and second electrical axes, a third terminal pair connected to the magnetic field coil, first signal terminals for connection to the first alternating signal, means connecting the first signal terminals in series with the input of said AC input amplifier across the first terminal pair, means connecting the output of the balanced demodulator to one of the second and third terminal pairs and the other of the second and third terminal pairs to the second signal terminals, means for deriving a phase reference signal from the second alternating signal and for connecting said reference signal to the balanced demodulator, circuit means for phasing said AC input amplifier and said demodulator so that any component of the first signal which is in phase-quadrature with the second signal will be rejected by the demodulator, and means for connecting the output of the balanced demodulator to output measuring apparatus; the improvement wherein said means for connecting the output of the balanced demodulator to one of the second and third terminal pairs comprises an integrating smoothing circuit including a low-drift DC amplifier, and means connecting the integrating smoothing circuit between the output of the demodulator and the output measuring apparatus; said balanced demodulator, integrating smoothing circuit and its low-drift DC amplifier being cooperatively arranged and adapted to provide high level forward path quadrature rejection.

2. Converter apparatus as claimed in claim 1, wherein the low drift DC amplifier comprises a low drift DC integrating feedback amplifier.

3. Converter apparatus as claimed in claim 1, wherein the integrating smoothing circuit comprises a resistance-capacitance integrating network, in addition to said low drift DC amplifier, and means connecting the network and the amplifier together in cascade, in that order.

4. Apparatus according to claim 1 wherein said means connecting the integrating smoothing circuit between the demodulator and the output measuring apparatus includes a DC output amplifier.

5. Converter apparatus as claimed in claim 4, wherein the low drift DC amplifier comprises a low drift DC integrating feedback amplifier.

6. Converter apparatus as claimed in claim 4, wherein the integrating smoothing circuit comprises a resistance-capacitance integrating network, in addition to said low drift DC amplifier, and means connecting the network and the amplifier together in cascade, in that order.

7. Apparatus according to claim 1 wherein the second terminal pair of said Hall device is connected to the output of said low-drift DC amplifier; and the third terminal pair is connected to the second signal terminals, for connection to the second alternating signal.

8. Magnetic apparatus for the measurement of the flow of an electrically conductive fluid comprising: alternating current means for estabilshing an alternating magnetic field in the flowing fluid so as to induce in the fluid an alternating electromotive force related to the fluid flow: first signal means for deriving a first signal from the induced electromotive force; second signal means for deriving a second signal related to the established alternating magnetic field; means for associating the alternating current means and the first signal means with the flowing fluid; electrical ratio converter apparatus responsive to the ratio of the first signal to the second signal, comprising an AC input amplifier; a balanced demodulator; an integrating smoothing circuit including a low-drift DC amplifier; means connecting the input amplifier, the demodulator, and the smoothing circuit together in cascade, in that order; a feedback circuit comprising a Hall device having a Hall plate with first and second electrical axes, a magnetic field coil for establishing a magnetic field in the Hall plate, first, second and third terminal pairs, the first and second terminal pairs being connected respectively to the first and second axes, and the third terminal pair to magnetic field coil; first and second signal terminals for connection to the first and second signal means; means connecting the first signal terminals in series with the input of the AC input amplifier, across the first terminal pair; means connecting one of the second and third terminal pairs to the output of the DC amplifier and the other of the second and third terminal pairs to the second signal terminals; means for deriving a phase reference signal from the second signal and for connecting said reference signal to the balanced demodulator; circuit means for phasing the AC input amplifier and demodulator so that any component of the first signal which is in phase-quadrature with the second signal will be rejected by the demodulator; electrical connection means connecting the first and second signal means to the first and second signal terminals, respectively; and means for connecting the output of the DC amplifier to apparatus for measuring the fluid flow in terms of said output; the said balanced demodulator and integrating smoothing circuit with its low-drift DC amplifier being cooperatively arranged and adapted to provide high level forward path quadrature rejection.

References Cited

UNITED STATES PATENTS

| | | | |
|---|---|---|---|
| 3,131,560 | 5/1964 | Cushman et al. | 73—194 |
| 3,263,500 | 8/1966 | Krishnaswamy et al. | 73—194 |

RICHARD C. QUEISSER, *Primary Examiner.*

JAMES J. GILL, CHARLES, A. RUEHL, *Examiners.*